SYSTEM FOR CORRECTING THE POSITION OF A WRITING OR READING BEAM RELATION TO A RECORDING MEDIUM

Filed Nov. 12, 1963

INVENTOR.
JOSEPH G. QUINN
HAROLD J. DALMAN
BY Ralph G. Hohenfeldt
ATTORNEY 3,221,337
SYSTEM FOR CORRECTING THE POSITION OF A WRITING OR READING BEAM RELATION TO A RECORDING MEDIUM Joseph G. Quinn, Milwaukee, and Harold J. Dalman, Brookfield, Wis., assignors to General Electric Company, a corporation of New York Filed Nov. 12, 1963, Ser. No. 322,990
4 Claims. (Cl. 346—110)

The present invention pertains to a system and apparatus for recording high density electrical or optical information on cine film, thermoplastic tape, or other recording media, with improved location accuracy.

The invention is primarily concerned with those recorders in which an information modulated electron beam is caused to impinge directly on the recording medium or in which the electron beam is converted to light that is projected onto the medium. The modulation signals may be derived from a video camera, for instance, and the writing device may be a kinescope tube or a cathode ray tube without a window or with an electron permeable window.

A major problem with tape medium recorders has been to hold the velocity of the tape drive mechanism constant so that the information appears at its proper relative position on the medium. The problem is manifested when the information is played back, for example, in a constant speed projector that does not account for mislocation of information which may have resulted from speed variations of the tape medium during recording. The customary approach to minimizing this problem is to compare continuously a reference with the recorder tape transport mechanism's speed and thereby develop an error signal which is fed back through a servo system to correct the speed of the drive motor. Because of the high inertia of such drive systems, however, their speed is difficult to change in true correspondence with the error signal and recording accuracy suffers.

The present invention obviates the need for trying to hold the velocity of a high inertia mechanism within small limits and proposes as an alternative adjusting the position of the practically inertialess writing beam relative to the recording medium. By this method the writing beam can be made to follow the recording medium speed changes with a response rate that is well within the limits of the recording rate, and no misplacement of information results.

One example where the invention may be employed is in connection with recording high density digital information by any of the known writing techniques wherein minimal error in readout requires very precise location of the information on the recording medium. Of course, it will be evident to those versed in the art after reviewing some of the illustrative examples of the invention given below that the invention has equal application to readout and recording devices.

An important use of the invention is in kinescope recording where picture information is derived with a television camera and the video signals so produced are transduced to a light image which appears on the face plate of a kinescope tube in either single successive lines of information or in raster form. The lines or raster may be projected onto a continuously and rapidly moving recording media such as cine film or photosensitive tape. In some cases, such as where recording is done on a thermoplastic tape which is sensitive to deformation and forms an image in accordance with an electric charge pattern deposited by the modulated electron beam, the face plate of the kinescope tube may be dispensed with. In these devices, various recording techniques are used. Sometimes, it is desired to record information in a frame format, as on cine film, where there is a blank or unrecorded space between successive frames. In such cases, one has the choice of sweeping the writing beam only horizontally in synchronism with the video camera and moving the tape medium at such rate that successive lines are written on it until a frame is completed. No cyclic vertical deflection of the writing electron beam is necessary in this instance. Here it is desirable to advance the film at constant speed or equal increments corresponding with the distance between lines until a field is completed after which the writing beam may be blanked until the next field is started. The successive fields may then be interlaced during projection so as to form a frame that presents all the information in a particular scene. Another method is to present a field on the kinescope, and to spread the field on the media as it progresses, at a uniform rate. The rotating mirror, or rotating prism, may be used to present adjacent lines of a field on the kinescope face in such manner that each line is projected through a single plane and the medium is moved at such rate that a frame is formed on it that includes one complete raster.

With either of the above mentioned recording modes, it is important to maintain uniform spacing between successive lines of information and between successive fields and frames of information. It is also important to start the writing of each frame or field at a specific location with respect to a reference point on the film.

When the recording medium is cine film, the reference point may advantageously be the edge of a sprocket hole. Thus, when the film is projected, each frame will be presented at the proper location with respect to the next adjacent frame. Of course, other reference points that are impressed on the medium at equal intervals may be used in place of sprocket holes.

In general terms, the invention involves continuously monitoring the location of a reference mark on the medium while writing thereon and then correcting the writing beam to its proper position, with respect to the reference, through the agency of an error signal that is developed by deviation of the reference mark from its theoretically correct location. In preferred embodiments, the position of the reference mark, which may be a sprocket hole, is ascertained by projecting the luminous spot developed on the face of a cathode ray tube onto the edge of a hole in the recording medium. The light spot on the media is viewed by a photomultiplier tube or other photosensor. The output signal from the sensor depends for polarity on whether above or below normal brightness is sensed. If the spot is on the reference mark or edge, a predetermined brightness is sensed and the output signal from an amplifier that is controlled by the photosensor will be nulled or in equilibrium. The amplifier output is supplied to the deflection plates or coil of the light spot producing cathode ray tube. If the reference mark is away from the spot, the amplifier produces a voltage signal of such polarity as to deflect the following light spot back to its null producing position. The voltage applied to the deflection plates of the cathode ray tube is the error signal which is also used to instantaneously and correctly locate the writing beam of a kinescope tube that is presenting the information which is being recorded. The error signal is time-related, by suitable electronic circuitry, with the writing beam so as to maintain its proper position with respect to the reference on the medium.

A more detailed description of the invention will now be set forth in reference to the drawings in which.

Figure 1:
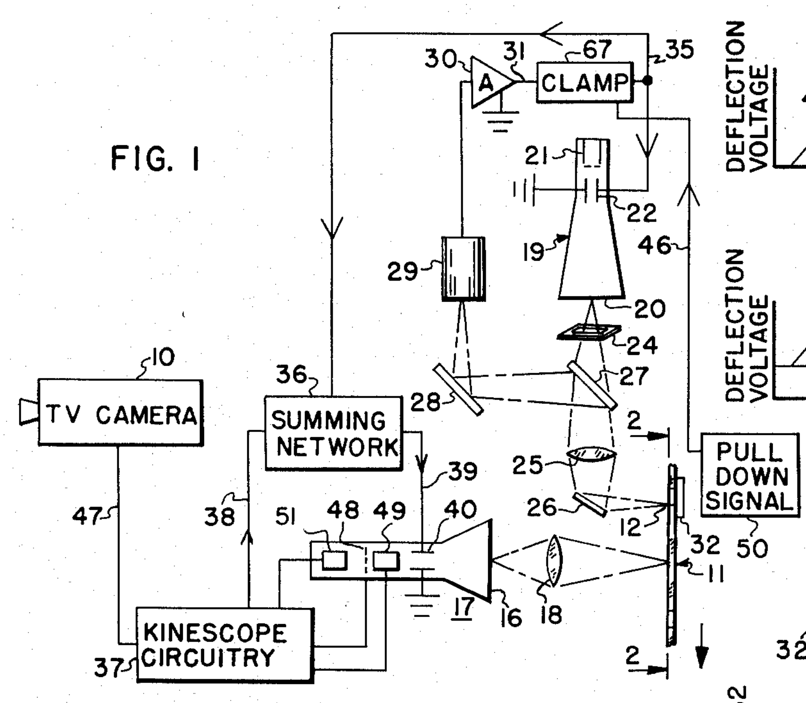
FIGURE 1 is a diagrammatic illustration of one type of recording system that employs the principles of the invention.

The principles of the invention may be understood by first considering the arrangement in FIGURE 1 as being adapted to record television pictures derived from a video camera 10. The recording medium may be a cine photographic film 11, for example. For the purpose of illustration, we may assume that standard television field and frame rates are being employed and that it is desired to record successive television fields at adjacent locations on recording medium 11. With this procedure, adjacent fields are out of correspondence with each other by one-half the line spacing. When the film is projected by a movie projector, for example, the film is transported so as to effect interlace of the adjacent fields and it is readily apparent that if the fields are not properly interlaced that information will be lost. The solution to this is to assure that each field is developed at a proper distance from a reference point such as one of the edges of sprocket hole 12, the lower edge being chosen in this case.

The picture information being recorded appears on the phosphorescent face plate 16 of a kinescope monitor tube 17. The tube functions in the usual way; that is, video signals derived from the video camera 10 intensity modulate the electron beam in tube 17 while the beam is being swept horizontally and vertically over the face plate. The lines of information appearing on face plate 16 are projected onto recording medium 11 through any suitable optical system such as is symbolized by the lens 18.

We will now consider how the writing beam, that is projected from face plate 16 of the kinescope 17, is caused to start writing each frame at the same distance at which all other frames are written with respect to the sprocket holes, edges, or other reference points. For this purpose, there is provided a position sensor that includes a cathode ray tube 19 which has a so-called phosphorescent face plate 20 and any suitable form of electron gun 21. The gun directs an electron beam toward the face plate 20 between a pair of electrostatic deflection plates 22. The electron beam spot may be deflected along a line on face plate 20. A slit 24 may also be employed to sharpen and define the luminous spot produced by the electron beam spot. The light spot is directed by a lens 25 onto an edge of the sprocket hole 12 by means of a totally reflecting mirror 26. The reference sprocket hole 12 is preferably the same one that the projector will use to locate the same frame during projection or other method of readout. In this example, the path of the light spot is such as to pass through a dichroic mirror 27. One edge of sprocket hole 12 intercepts the light spot and reflects it back partially over its original path to dichroic mirror 27 where it is reflected to another totally reflecting mirror 28 and directed to any suitable photosensor such as photomultiplier tube 29. The magnitude of the output signal from the photomultiplier tube 29 depends upon the amount of light that is reflected at the edge of sprocket hole 12. The ouput signal is fed to an amplifier 30, the output conductor 31 of which has no voltage appearing on it if the intensity of the reflected light spot is at a predetermined level. In other words, the amplifier is nulled or at equilibrium. Generally, the amplifier output is nulled when half of the light spot is on the film and the other half passes through the sprocket hole and is reflected in reality by a mirror 32 which is immediately behind the recording medium.

Various optical paths may be devised for returning part of the light spot to the photomultiplier tube 29. For example, mirror 28 can be removed if it is more convenient to direct the light spot beam into the photomultiplier without bending it at another right angle. A reflecting mirror 32 behind the sprocket hole is not always essential. That is, one may depend upon the recording medium for its reflective qualities and use an absorbing surface behind the film sprocket hole in place of a reflector such as 32. The photosensor may also be located behind the film in which case mirrors 32 and 28 would be eliminated and the edge of the sprocket hole would divide the light spot. The light source, cathode ray tube 19, may also be variously positioned as long as its light spot is projected onto a reference mark carried by the recording medium.

It will be seen in FIGURE 1 that if the film is high in reference to the writing beam, the brightness of the reflected light spot on photomultiplier tube 29 will be low. If the film is somewhat low, the brightness of the reflected light spot will be relatively higher. In either case, amplifier 30 develops an output signal, but of opposite polarity. The output signal is applied to deflection plates 22 in cathode ray tube 19 to cause the phosphorescent spot to be deflected to a position which restores the system to equilibrium. In other words, the light spot that is projected onto the sprocket hole edge will follow that edge until a predetermined portion of the light is absorbed and the remainder is reflected by mirror 32. The amplified error signal feeds through a clamping circuit 67 symbolized by a box marked clamp. Its purpose will be described below.

The signal that is applied to deflection plate 22 is the error signal which is used to correctly locate the writing beam of kinescope 17. For this purpose, there is a conductor 35, that delivers the error signal to plates 22 and to a summing network 36. The vertical sweep signal for the kinescope is taken from conventional kinescope circuitry represented by the block 37 and injected into the summing network by way of a conductor 38. Any suitable summing network or differential amplifier may be employed here. The output from the summing network appears on a conductor 39 in the form of a voltage that is applied to the vertical deflection plates 40 of kinescope 17. Of course, magnetic deflection coils could be substituted as is well known. The voltage applied to deflection plates 40 is the sum of the normal vertical scan voltage fed from conductor 38 and the error correction signal fed in from conductor 35. Thus, the effect is to bias the writing beam in kinescope 17 by an amount which locates it at an exact distance from the edge of the sprocket hole before writing begins and to compensate for any film motion that may occur during writing of the field.

Summing network 36 may be a network that accepts at least two input signals, one of which modifies the other, and that has at least one output circuit from which the modified signal emerges. Usually the input signals are admitted to respective paralleled resistors which are joined at a common point that serves as the input to an operational amplifier with inverse feedback. The basic elements of a suitable summing circuit are described in the book by H. J. Reich, "Functional Circuits and Oscillators," D. Van Nostrand, Co., Inc., Princeton, New Jersey, 1961, pages 1–3, and a suitable amplifier for this circuit is described on pages 22–24 of this book.

Figure 3A:
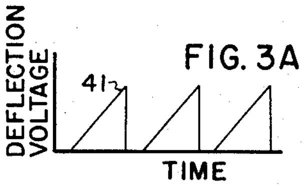
FIGURES 3A–3B show some voltage and time relationships which are useful in understanding the FIGURE 1 embodiment of the invention.
Figure 3B:
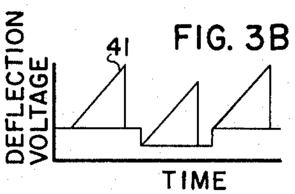
Figure 2:
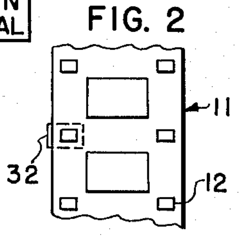
FIGURE 2 is a plan view of a segment of a recording medium taken on the line 2—2 in FIGURE 1.

The normal vertical deflection voltage on kinescope 17 is saw-tooth in form as depicted in FIGURE 3A and this is generated by the sweep generator which is in conventional kinescope circuitry 37. In FIGURE 3A it is seen that the voltage peaks 41 all have the same amplitude. In FIGURE 3B, is shown what happens when the error signal 42 adds to and subtracts from the sweep voltage. The error signal constitutes a bias with such polarity as to raise or lower the writing beam and position it at a fixed distance from the sprocket hole to start.

It is necessary to prohibit the light spot that appears on the edge of a sprocket hole 12 from following that edge when the recording medium is being transported. It is convenient to use a clamping system to accomplish this. A clamping system 67 may generate the holding voltage. The clamping system is energized from a pull down signal generator 50 which is schematized. When the medium begins to transport, due to action of the mechanism, not shown, the signal generator acts. The signal may be impressed over a conductor 46.

Pull-down signal generator 50 may be a commutator type switch that removes a D.-C. bias or control voltage from clamp circuit 67 to inactivate it when pull-down of recording medium 11 begins. The commutator switch needs no description, except to say that it may be operated by mechanical coupling with the pull-down mechanism, not shown, which is found in almost any cine camera or projector.

Clamp circuit 67 is merely a gate circuit or a bi-stable multivibrator that is operated by the pull-down signals. It prevents the signal originating in photosensor 29 from passing while the recording medium 11 is being pulled down and its allows return of the light beam 12 to pick up the next reference point. A basic diode gate circuit that will serve the purpose is shown in FIGURE 37*a* and described on pages 47–49 in the above-cited book by H. J. Reich. In this circuit the signal passes to plates 22 in the cathode ray tube 19 from amplifier 30 unless a control voltage is removed from across a resistor in series with a diode, not shown. The diode is thereby no longer reverse biased in which case it conducts and shunts the signal from the plates 22.

The composite video signals from camera 10 may be supplied to conventional kinescope circuitry 37 and to kinescope 17 by way of a conductor 47. After amplification, the video signals are applied in the conventional manner to a beam modulating grid 48 to provide intensity modulation that corresponds with the scanning beam in the video camera 10. The customary horizontal deflection plates 49 are provided in the kinescope 17, and as is well known, horizontal deflection is synchronous with that in the video camera. The kinescope includes a conventional electron gun 51.

Figure 4:
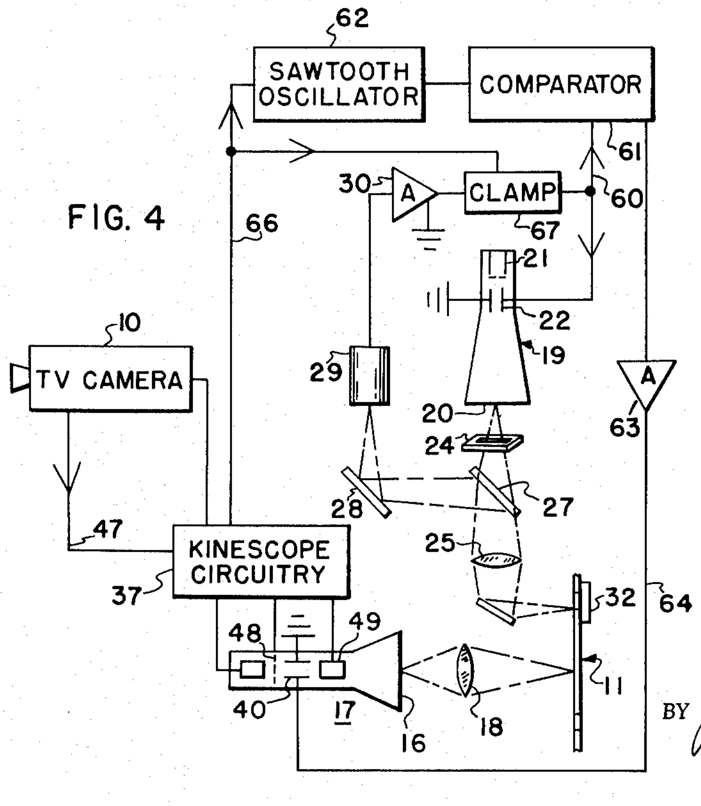
FIGURE 4 is an alternative embodiment of the invention.

The embodiment of the invention shown in FIGURE 4 is especially adapted to record in a frame-by-frame format while the medium is in constant motion, so that the horizontal lines appearing on face plate 16 of kinescope 17 are deposited consecutively on the recording medium 11 until a frame is completed. Then recording is blanked until the start of the next frame. In FIGURE 4, components that appear in FIGURE 1 and perform the same function are given the same reference numerals.

In FIGURE 4 the mechanism for transporting the recording medium 11 is not shown because such mechanisms are well known to those who are involved in the tape transport art. For the purpose of the instant explanation, it may be assumed that there is a suitable mechanism for moving the film lengthwise at a constant speed. Driving with a synchronous motor is desirable in order to avoid accumulation of errors. It is possible, but not necessary, to advance the film at one speed during writing and at a lower speed between frames to reduce the width of the blanking interval. Such drives are unduly complicated and expensive. Because of the short blanking time, utilization of the film surface is reduced only slighty by running at a constant speed.

Figure 5A:
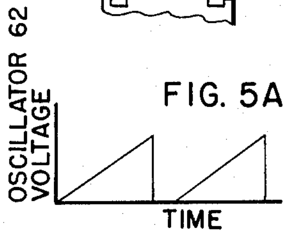
FIGURES 5A–5C show some voltage and time relationships that are useful in understanding the FIGURE 4 embodiment.
Figure 5B:
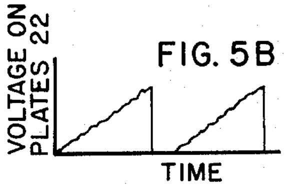
Figure 5C:
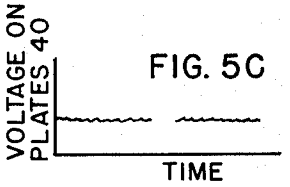

In the recording mode used in FIGURE 4, if the medium 11 were moving at a constant rate, the correction voltage that would be applied to deflection plates 22 of the cathode ray follower tube 19 would change at a uniform rate to cause the light beam to follow the sprocket hole. That is, the voltage applied to deflection plates 22 would be saw-tooth as depicted in FIGURE 5A. However, if the medium speed varies, the voltage to deflection plates 22 will vary from the theoretically correct sawtooth form as shown in FIGURE 5B. This undulating waveform appears on a conductor 60 and on deflection plates 22. The same voltage is supplied to a differential amplifier or comparator 61. Comparator 61 also receives the output voltage from a sawtooth oscillator 62 which is very stable and produces a linear sawtooth output waveform which is suitable to use as a comparison reference. In practice, sawtooth oscillator 62 may be a source of sawtooth voltage normally found in TV camera circuitry. The instantaneous amplitude of the voltage applied to plates 22 in cathode ray tube 19, that is shown in FIGURE 5B, is compared with the corresponding instantaneous amplitude of the reference waveform that is produced by sawtooth oscillator 62. This comparison is made in comparator 61. The output of comparator 61 is an undulating voltage signal as shown in FIGURE 5C. It can be seen that since the voltage applied to deflection plates 22 should be a pure sawtooth waveform, a comparison of that voltage to the reference sawtooth voltage generated in oscillator 62 will result in a difference voltage as shown in FIGURE 5C which is a measure of the deviation of the film from its desired uniform speed. The signal may be amplified in an amplifier 63 and supplied over a conductor 64 to vertical deflection plates 40 in kinescope writing tube 17. This small correction voltage continuously raises and lowers the writing beam in direct correspondence with the medium speed variation. Hence, the net effect is to write straight lines on the medium, precisely spaced from the preceding line and at the correct theoretical position.

In this arrangement, the vertical blanking signal, which may be taken from the kinescope circuitry 37 through conductor 66, may be used to actuate the clamp circuit 67 which resets the spot of cathode ray follower tube 19 while the medium is traversing the distance between frames and permits the spot to pick up the next succeeding reference point. Synchronizing pulses may also be taken from the kinescope circuit 37 and supplied to the triggered sawtooth oscillator 62 in order to maintain its synchronism with the vertical sweep circuitry of the TV system.

Clamp 67 in FIGURE 4 may constitute the so-called "not" circuit one of which is shown in FIGURE 38 and described on page 49 of the above-cited book by H. J. Reich. In this circuit, a resistor in series with a diode and a reverse biasing battery are shunted across the signal source such as amplifier 30 and the plates 22 of cathode ray tube 19. When a control voltage pulse is applied, there is no output because the diode is then forward biased and constitutes a short circuit for the signal. When there is no control voltage, the signal is not shunted and hence, is applied to plates 22. In the present case, the vertical blanking signal taken from kinescope circuitry 37 by way of conductor 66 constitutes the control voltage. Thus, when a blanking pulse occurs coincident with the end of a frame of information, signal from amplifier 30 is blocked and the beam controlled by plates 22 reset to allow the beam spot to pick up the next sprocket hole or reference point.

Comparator 61 is a conventional differential amplifier such as is described and illustrated at pages 6–10, in the cited book by Reich.

As just described, the system of FIGURE 4 would record each scene upside-down and reversed from left to right in the same manner as an ordinary cine camera records. In the event that it is desired to place the image on the film in an upright position, the writing beam of kinescope 17 must be deflected by the sum of two voltages. These voltages are the normal vertical deflection voltage needed to produce the raster and the voltage generated by the sprocket hole follower to additionally deflect the beam and keep it in step with the film travel. This may be accomplished easily by merely replacing the comparator 61 with a summing network. The recording systems described in connection with FIGURES 1 and 4 involve writing with a beam of visible light on a light sensitive medium. It should be appreciated that the systems are also readily adaptable to writing with an electron beam on an ordinary silver halide cine film or on a thermoplastic tape on which an electrostatic image is formed. Usually, when writing is done directly with an electron beam, the writing beam source and medium are contained in a vacuum chamber. In this recording mode, the face place 16 of kinescope tube 17 in FIGURE 4 is absent so that the electron beam may be projected toward the recording medium without impinging on a phosphor to produce light. Lens 18 is also unnecessary when writing directly with the electron beam. Those versed in the art will also understand that the converse of the systems above described may be adapted for reading the recorded information with light or electron beams.

An example of a thermoplastic tape that is suitable for direct recordation with electrons and for the development of an electrostatic image may be seen in U.S. Patent No. 3,063,872, which is assigned to the assignee of the instant invention. This tape receives an electron charge pattern representative of the image, and when it is exposed to heat, the electrostatic forces bring about minute depressions in the film in accordance with the image pattern. A subsequent cooling step fixes the image. Optical systems that depend on reflection of light by the surface deformation are used to view thermoplastically recorded images as opposed to transmission of light as in ordinary film.

Although embodiments have been described in considerable detail to demonstrate the basic principle of compensating the position of the writing or readout beam instead of trying to account for speed or location variations in the media drive mechanism by seeking to correct the speed or position, such descriptions are to be considered illustrative rather than limiting, for the invention may be variously embodied in both writing and readout devices and its true spirit and scope is to be determined only by interpretation of the claims which follow.

It is claimed:

1. In a system for transferring information to or from a recording medium through the intermediary of an electron beam, (a) means for detecting the position of reference points on a medium, (b) means for generating a first signal that corresponds with the instaneous position of a reference point with respect to an arbitrary stationary point, (c) an electron beam that is adapted to read or write information and vertical deflection means for positioning the beam vertically with respect to the medium, (d) a vertical deflection signal source in circuit with the vertical deflection means of the information electron beam source, (e) means for combining the vertical deflection signal with said first signal to produce a final vertical deflection signal for maintaining the information beam in its correct position relative to the medium reference points, and (f) means for producing a third electric signal in response to initiation of each successive predetermined movement of said medium, (g) said third signal being coupled with said means for detecting the position of a reference point to reset the same for detecting the position of the next successive reference point on the medium.

2. In a system for transferring information to and from a recording medium through the intermediary of an electron beam, (a) means for detecting the position of reference points on a medium, (b) means for generating a first signal that corresponds with the instantaneous position of a reference point with respect to an arbitrary stationary point, (c) an electron beam that is adapted to read and write information and vertical deflection means for positioning the beam vertically with respect to the medium, (d) means for generating a second signal which corresponds with the theoretical instantaneous position of the medium reference points with respect to the arbitrary stationary reference point, (e) means for comparing said first and second signals to produce a vertical position signal for application to the vertical deflection means of the information beam to maintain the information beam in its correct position with respect to the medium reference points, and (f) a clamping circuit and means for actuating the same periodically during the recording process, (g) said clamping circuit producing signals when actuated which reset said first signal generating means to thereby pick up the next successive reference point on the medium.

3. A system for transferring information with respect to successive intermittently presented frames of a recording medium wherein each frame is desired to be at a predetermined distance from one of a series of reference points on the medium, comprising:

(a) a cathode ray tube including means for deflecting its electron beam in a line on its faceplate on which a light spot is formed where the beam impinges on it, (b) optical means projecting the light spot onto a light intensity modulating reference point on the medium, (c) a light sensing means which is in an equilibrium state when it receives a certain amount of light that has been modulated by the reference point and that produces a first electric error signal of magnitude and polarity depending on the distance and direction in which the light spot is moved to be on the point, (d) the said error signal being applied to the deflection means to restore the equilibrium state, (e) an information coupling electron beam that is adapted to be scanned over an area that corresponds with a frame of information on the medium, (f) individual deflection means for scanning the information beam vertically and horizontally in a frame, (g) a vertical sweep oscillator producing a second electric signal for influencing the information beam vertically on the frame, (h) a summing network connected to receive the vertical sweep oscillator signal and the error signal and being adapted to combine these signals to produce a third electric signal, (i) said third signal being supplied to the vertical deflection means for the information beam to thereby correct its position instantaneously and continuously at the desired distance from the same reference point aforesaid, and (j) means for producing another electric signal in response to initiation of each successive movement of said medium, (k) said other signal being coupled with said cathode ray tube deflection means to reset the same for detecting the position of a succeeding reference point on the medium.

4. In a system for transferring information to or from a recording medium that is in continuous motion and wherein the information is transferred through the intermediary of an electron beam, means for improving the location accuracy of the information beam relative to successive reference points that are spaced along the medium, comprising:

(a) a cathode ray tube including means for deflecting its electron beam in a line on its faceplate on which a light spot is formed where the beam impinges on it, (b) optical means projecting the light spot onto a selected one in a series of reference points on the medium, (c) a light sensing means adapted to receive light that is modulated by the reference point and to produce a first varying electric signal that increases at an essentially linear rate as the medium moves but that is nonlinear to the extent that the velocity of the medium fluctuates, (d) said first electric signal being supplied to the abovenamed deflecting means to cause the electron beam to follow velocity fluctuations of the reference point, (e) an information coupling electron beam and horizontal and vertical scanning means associated therewith, (f) comparator means, (g) an oscillator generating a reference waveform, (h) the said comparator means being connected to receive said reference waveform and said first electric signal and being adapted to produce a difference error signal, (i) the said error signal being supplied to the vertical deflection means associated with the information beam to continuously and instantaneously locate said beam at a proper distance from the selected one reference mark to account for velocity and position variations of the medium, and (j) a clamping circuit and means actuating the same synchronously with the reference waveform, (k) said clamping means producing a signal when activated which is supplied to the deflection means in the cathode ray tube to reset the beam thereof to pick up a successive reference point on the medium.

References Cited by the Examiner

UNITED STATES PATENTS

| | | | |
|---|---|---|---|
| 2,523,156 | 9/1950 | Somers | 250—219 X |
| 2,750,442 | 6/1956 | Bedford | 178—7.14 |
| 2,830,285 | 4/1958 | Davis et al. | 340—172.5 X |
| 2,901,538 | 8/1959 | Artzt | 178—6.7 |
| 2,922,841 | 1/1960 | Graziano | 178—7.2 X |
| 3,037,202 | 5/1962 | McNaney | 346—110 |
| 3,051,955 | 8/1962 | Pfleger et al. | 346—110 |
| 3,144,637 | 8/1964 | Adams et al. | 340—172.5 |

LEO SMILOW, *Primary Examiner.*